Nov. 15, 1960 W. E. DOUGHERTY 2,960,206
CONVEYOR SYSTEM
Filed April 9, 1956 2 Sheets-Sheet 1

INVENTOR
William E. Dougherty
BY
Harness, Dickey & Pierce
ATTORNEYS.

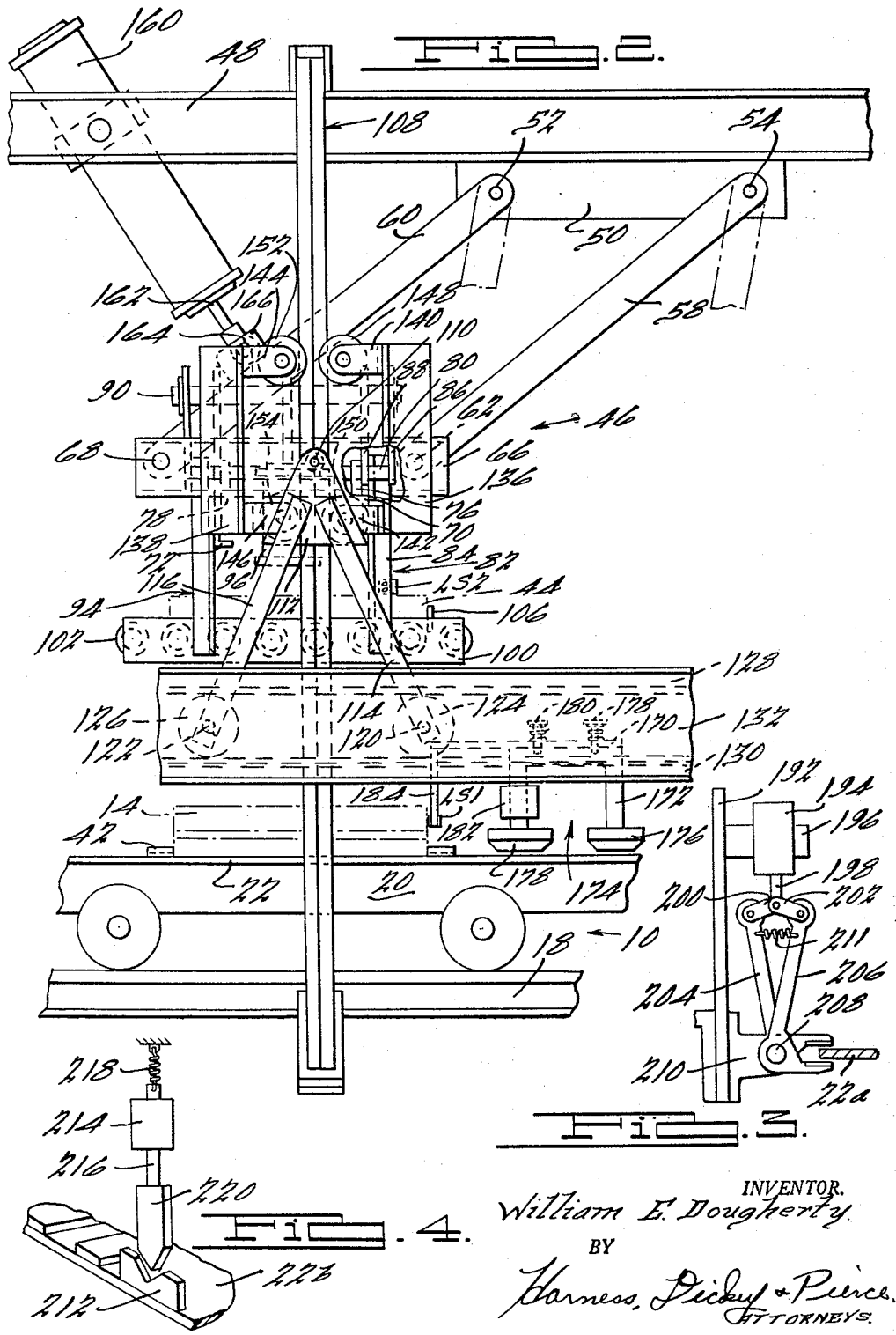

2,960,206
Patented Nov. 15, 1960

2,960,206

CONVEYOR SYSTEM

William E. Dougherty, Detroit, Mich.
(P.O. Box 97, Zelienople, Pa.)

Filed Apr. 9, 1956, Ser. No. 576,858

12 Claims. (Cl. 198—35)

This invention relates to conveyor systems.

Conveyor systems employed in the handling, manufacture, processing or assembling of workpieces are operated, during any work interval, on either a continual or a continuous basis. In continual operation, the conveyor system intermittently steps or indexes workpieces from one to another of a series of spaced-apart work stations. Continuous movement of a main conveyor has normally been feasible only where the movement of the article is a part of the treatment, where there is provision to move the workpieces laterally between the conveyor and a stationary position at a work station, or where the operation at the work station is manually performed or controlled.

Under certain of the principles of the present invention, an article may be automatically placed upon a moving conveyor, with the velocity of the article in the direction of conveyor movement being exactly equal to the velocity of the conveyor, at least at the instant of contact. The time at which the article is deposited upon the conveyor may be synchronized with the conveyor movement so that the article will be placed at an exact, preselected location upon the conveyor. As examples, an article may be accurately placed upon a moving pallet in a palletized conveyor system, the article may be placed in engagement with any one of a plurality of over-head, spaced-apart chain-driven hooks, or the article may be hung upon a traveling work carrier, in each case without jarring impact or rapid change of speed or direction of the moving article at the instant of transfer. The inventive principles herein enunciated are also applicable to and are representatively embodied in an arrangement for automatically performing a work operation upon a moving workpiece, the disclosed system being designed to perform the operation of automatically assembling one part to another in precise, preselected relationship while both parts are moving.

In general, the disclosed system comprises a conveyor adapted to move continuously during the working period and a transporting means for moving an article from a remote point to the conveyor. In the representative arrangement shown, the transporting means is an overhead parallelogrammatic mechanism adapted to swing an article through an arc, while maintaining the article in preselected orientation, to a position proximate the conveyor. In the preferred arrangement, in which a horizontally moving conveyor is employed, the article is moved both vertically and horizontally, with the rate of vertical movement decreasing and approaching zero and the rate of horizontal movement being substantially equal to the rate of conveyor movement. These velocity relationships are achieved by employing the conveyor itself (or a part moving therewith) as the source of motive power for the transporting means or at least as a supervening controller of the rate of movement of the transporting means. In the disclosed arrangements, a latching mechanism is connected to the transporting means and is selectively actuatable to mechanically connect the transporting means to the conveyor. If precise positioning or assembling is to be performed, a sensing device is so disposed as to signal the arrival, at a preselected position, of a point or article on the conveyor. Control equipment is then actuated by the sensing device to operate the latching mechanism.

A more complete understanding of the principles of the invention may be obtained from the following detailed description of embodiments of the invention when read with reference to the accompanying drawings in which:

Fig. 2 is a fragmentary side elevational view of the equipment of Fig. 1;

Fig. 3 is a fragmentary end elevational view of a modified form of latching mechanism; and Fig. 4 is a fragmentary perspective view of still another form of latching mechanism.

Figure 1:
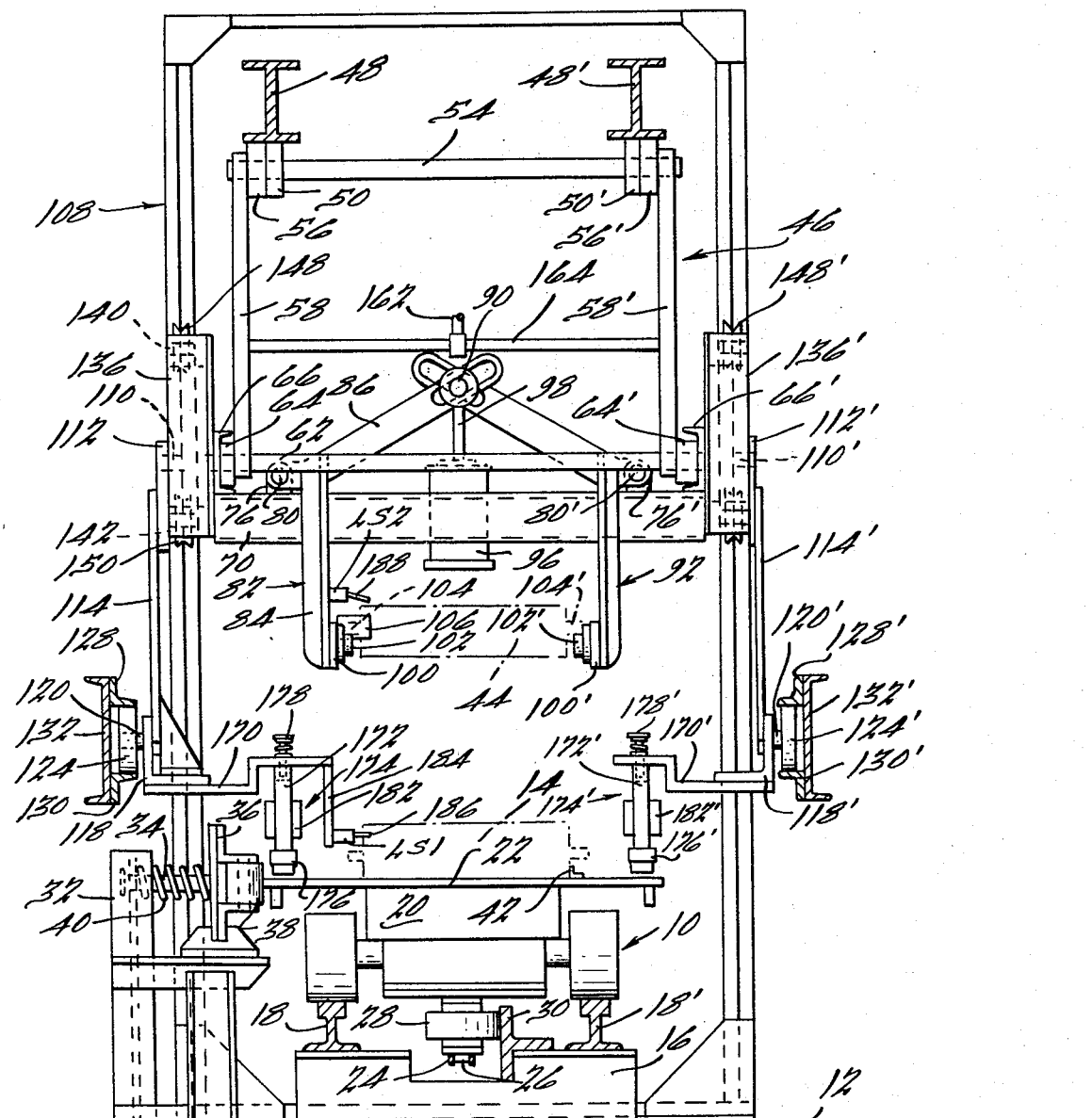
Figure 1 is an end elevational view of a conveyor system embodying the principles of the invention, in partial section.

The equipment represented in Figs. 1 and 2 of the drawings includes a main conveyor 10 supported upon a surface 12 and adapted to carry a series of articles such as the article 14, represented in phantom, from a remote point to the left of the shown equipment, in the view of Fig. 2, to a remote point to the right of the equipment shown in that figure. The conveyor system may be of any appropriate type. In the representatively disclosed form, the conveyor 10 comprises a plurality of spaced-apart pedestals 16 supported upon the surface 12, and carrying a pair of rails 18 and 18' disposed in spaced parallelism with one another to define a track. A series of wheeled cars, such as car 20, having article supporting surfaces, such as surface 22, are mounted upon the rails 18 and 18'. Any appropriate motive means may be employed for moving the cars 20 along the rails 18 and 18', that motive means being shown to comprise a driven endless chain 24 secured to a shaft, such as shaft 26, depending from the under-structure of each of the cars.

The illustrated conveyor 10 is representative of a commercially available conveyor system except for the provision which has been made to insure exact lateral positioning of the car 20 at least during its travel adjacent and through the shown equipment. This means comprises a roller 28 rotatably mounted upon the shaft 26 and engageable with an accurately machined surface 30 rigidly supported upon the pedestal 16. One or more assembles are provided for forcing the car 20 to the right in the view of Fig. 1 to maintain the roller 28 in engagement with the machined surface 30. The assembly comprises an upright 32, rigidly fixed with respect to the surface 12 and the plate 30, slidably supporting a rod 34 which is mechanically integral with a bracket 36. Bracket 36 rotatably supports a roller 38 adapted to exert a continuing force, under the impetus of spring 40, against the edge of the article-carrying surface 22 of the car 20.

Some means appropriate to the particular shape of the article 14 should be mounted upon the surface 22 to establish the position of the article 14 laterally of the line of motion of the conveyor. Representatively, an angle 42, secured to the surface 22, serves as an abutment against which the article 14 may be placed. In the representative arrangement, as will be seen, it is the position of the article 14 itself which is sensed, and it is therefore not imperative that means be provided for accurately locating the article 14 longitudinally of the surface 22, although it will be appreciated that if it is desired to sense the location of the car 20 or any correlative element on other conveyor systems, the position of the article upon the conveyor must be appropriately pre-established.

The remainder of the equipment shown in Figs. 1 and 2 of the drawings constitutes a transporting means, and controls therefor, for moving an article, such as article 44, from a remote position, representatively an upper position, to a position in exact preselected relationship with the article 14. In the representative form disclosed, this transporting means comprises a parallelogrammatic mechanism 46 so that the attitude of the article 44 is maintained constant throughout its motion. The transporting means is supported by a pair of overhead, spaced-apart beams 48 and 48' which are rigidly fixed with respect to the surface 12 in any appropriate manner. Plates 50 and 50', rigidly secured to beams 48 and 48', respectively, support a pair of parallel cross shafts 52 and 54 through the medium of appropriate bearings. The shown bearings 56 and 56' rotatably support cross shaft 54. Parallel suspension arms 58 and 58' are secured to the opposite ends of shaft 54 and two additional parallel suspension arms, including arm 60, are secured to the opposite ends of shaft 52.

At their lower ends, parallel suspension arms 58 and 58' are secured to a lower cross shaft 62 journalled in bearings 64 and 64' secured to horizontally disposed channels 66 and 66', respectively. The other two parallel suspension arms, including arm 60, correspondingly engage lower cross shaft 68 which is secured, through the medium of bearings, to the rearmost ends of channels 66 and 66'. Channels 66 and 66' are rigidly interjoined by a pair of cross channels 70 and 72, the channels 66, 66', 70 and 72 constituting a main carrying frame.

Upstanding apertured tabs 76 and 76' are secured near the opposite ends of channel 70, and corresponding tabs, including tab 78, are secured near the opposite ends of the upper surface of the channel 72. A shaft 80 rotatably engages tabs 76 and 78 and a corresponding shaft 80' engages the pair of tabs including tab 76'. Shafts 80 and 80' support a clamping assembly comprising four clamping arm weldments. Clamping arm weldment 82 comprises a generally vertically disposed angle 84 welded between and at an angle to a pair of bars 86 and 88. The lower ends of bars 86 and 88 are apertured to engage shaft 80. Bars 86 and 88 extend upwardly and toward the center line of the mechanism and their upper ends are slotted to engage a horizontally disposed pin 90. Clamping arm weldment 92 is similarly but reversely formed, being pivotally mounted on shaft 80' and the upper ends of the upper bar members thereof being slotted to engage pin 90. A corresponding pair of clamping arm weldments, including weldment 94 is disposed at the rear of the mechanism (to the left in the view of Fig. 2) and cooperates with the pin 90.

A clamping cylinder 96, which may be electromagnetically, hydraulically, pneumatically, or otherwise operated, is secured to the main carrying frame, including members 66, 66', 70 and 72, in any appropriate manner. The piston rod 98 thereof extends upwardly and is secured to pin 90. As a result, retraction of the piston rod 98 will produce a downward movement of pin 90 and a consequent pivoting of the several clamping weldments, such as weldments 82, 92 and 94, about the shafts 80 and 80'. If desired, bearing or guide means may be provided to insure that pin 90 moves only vertically, despite any unequal load on the clamping arm weldments, to avoid the exertion of lateral forces upon the piston rod 98.

The lower ends of clamping arm weldments 82 and 94 are interconnected by horizontally disposed carrying plate 100, and a corresponding plate 100' interjoins the other two clamping arm weldments. A plurality of flanged carrying rollers 102 are rotatably supported by plate 100 and a similar plurality of carrying rollers 102' are rotatably supported upon the plate 100'. The plane of the upper surface of these rollers defines the carrying surface which supports the upper article 44.

To illustrate the capability of the equipment to perform the disclosed closing operation with a minimum of jarring, the articles 44 and 14 to be assembled are representatively illustrated as molding flasks containing rammed molding sand which has a tensile strength measured in ounces. The operation to be performed is that of closing the upper mold half 44 to the lower mold half 14 in exact registration. It is assumed that at least the upper mold half 44 is provided with longitudinally extending side projections 104 and 104', one coplanar face of each of which engages one set of the rollers 102 and 102' and the edges of which engage the flanges on the rollers 102 and 102' to insure both a proper vertical and a proper lateral position of the flask 44. It is assumed that each of the upper flasks, such as flask 44, is placed upon the rollers 102 and 102', either automatically or manually, from the rear of the machine and is advanced until the forward edge thereof engages a stop 106 on plate 100, so that each succeeding flask is accurately positioned longitudinally of the equipment.

A floating guide frame 108 is representatively a generally rectangular structure, the upper member of which overlies and is spaced from the supporting beams 48 and 48' and the side members of which are representatively shown to have a square cross section. Frame 108 is supported solely about an axis defined by pins 110 and 110'. Each of these pins is secured in one of the vertical side members of frame 108 and engages one of the plates 112 and 112'. A pair of diverging stabilizing arms, such as arms 114 and 116, are secured by welding or otherwise to each of the plates 112 and 112'. An angle 118 (Fig. 1) interjoins the lower ends of the arms 114 and 116 and carries a pair of stub shafts 120 and 122 upon which rollers 124 and 126 are rotatably mounted. Rollers 124 and 126 roll in a rail formed of a pair of spaced-apart angles 128 and 130 one flange of each of which is welded to the web of a channel 132, the rail being fixed with respect to the surface 12 in any suitable fashion (not shown). A corresponding structure is provided on the other side of the mechanism and corresponding parts thereon are similarly designated but with a prime being affixed.

A plurality of guide rollers, rotatably supported relative to the main clamping frame of the mechanism, engage each of the vertical members of the guide frame 108. Thus, at each side of the structure, two spaced-apart, vertically disposed angles, such as angles 136 and 138, are welded or otherwise secured to the longitudinally extending carrying frame channel, such as channel 66. Angle brackets 140 and 142 are secured at the upper and lower ends, respectively, of angle 136, and angle brackets 144 and 146 are secured at opposite ends of angle 138. Each of these brackets rotatably supports a guide roller 148, 150, 152 and 154, respectively. These rollers engage one of the vertical members of the guide frame 108, and corresponding rollers on the other side of the mechanism engage the other vertical member of the guide frame 108.

The equipment is normally retained in its shown position by a return cylinder 160 (Fig. 2), the body of which is rotatably supported upon the beams 48 and 48' and the piston rod 162 of which is connected to a shaft 164 extending between a pair of brackets, such as bracket 166, mounted on the rear pair of parallel suspension arms, including arm 60.

In order to impart motion to the transporting means, or at least to control the rate of movement thereof, means are provided for selectively latching the transporting means to the main conveyor. In the representative arrangement disclosed in Figs. 1 and 2, a car-type main conveyor 10 is employed in which the upper plates or surfaces 22 of the several cars 20 are of ferrous metal. Advantage is taken of this fact by providing electromagnetic latching means. Thus, a bracket 170 (Fig. 1) is welded or otherwise secured to the angle 118 and extends inwardly towards the longitudinal center line of the machine. The generally U-shaped core structure 172 of an electromagnet 174 is so mounted upon the bracket 170 that the two pole shoes 176 and 178 (Fig. 2) are normally disposed in spaced proximity to the upper surfaces 22 of the successive cars 20. In the representative supporting arrangement disclosed, pins 178 and 180 are secured to the core structure 172, extend through apertures in bracket 170, and terminate in head portions, with an individual compression spring being interposed each head portion and the upper surface of the bracket 170. Therefore, upon energization of the coil 182 of the electromagnet 174, the entire electromagnetic structure may move downwardly a small distance to physically contact the surface 22, thereby securely latching the transporting means to the conveyor. A corresponding arrangement is shown on the other side of the machine.

In the operation of the equipment shown in Figs. 1 and 2 of the drawings, the piston rod 162 of the return cylinder 160 is normally retracted to retain the transporting means in its upper position, and the electromagnet 174 is normally deenergized. At the appropriate point in the movement of the lower article 14, cylinder 160 is released so that its piston rod 162 may freely be extended, and the electromagnet 174 is energized so that it locks to the surface 22 of the car 20. Electromagnet 174 is therefore translated horizontally at exactly the same rate of motion as surface 22 and this movement is communicated through bracket 170 and angle 118 to move the rollers including rollers 124, 124' and 126 along their tracks. This results in a translational motion of the guide frame 108 at the same rate as the translational motion of the surface 22. This motion is communicated through the several guide rollers including rollers 148–152 to the main carrying frame, through the several rollers 102 and 102' and hence to the upper article 44. In this manner, article 44 is moved horizontally at exactly the same rate as the movement of the lower article 14, that is, the horizontal component of the motion of article 44 will be exactly equal to the horizontal component of the motion of article 14. Since the carrying frame is moved to the right in this manner, the parallelogrammatic mechanism including the parallel suspension arms such as arms 58, 58' and 60, will force the cross shafts 62 and 68 to follow arcuate courses so that the carrying frame is moved downwardly relative to the guide frame 108, carrying the upper article 44 downwardly toward the article 14, and yet maintaining the attitude of the article 44 constant, that is, maintaining a constant angle between the plane of any surface of the article 44 and the plane of surface 22. While the horizontal component of motion of article 44 is constant if the motion of car 20 is constant (or otherwise varies identically therewith), the vertical component of motion of article 44 varies in accordance with the position of the parallelogrammatic mechanism. The rate of vertical motion decreases as the article 44 approaches the article 14. If the dimensional relationships are selected so that article 44 contacts article 14 at the point when the parallel supporting arms, such as arms 58 and 60, are vertical, the vertical velocity of the article 44 will be zero relative to the vertical velocity of article 14 (normally zero) at the instant of contact. In the disclosed and preferred arrangement, this engagement between articles 44 and 14 occurs at a point somewhat prior to the point of pure verticality of the parallel suspension arms, the angles of arms 58 and 60 at the point of engagement between articles 44 and 14 being represented in phantom in Fig. 2 of the drawings.

After article 44 is in engagement with article 14, it is transferred from the transporting means to the preselected position upon conveyor 10, that is, in the disclosed example, in preselected position upon article 14 which in turn is carried by conveyor 10. This transfer is accomplished by actuating clamping cylinder 96 to move the rod 98 thereof, and hence the pin 90, downwardly. This causes the clamping arm weldments, such as weldments 82 and 92 (Fig. 1), to be pivoted about shafts 80 and 80' so as to move the rollers 102 102' outwardly from the longitudinal center line of the equipment and away from the supporting surfaces of the article 44. Since time must be allowed for the stop 106 to move laterally of the forward end of the article 44, it is preferable that the article 44 engage the article 14 prior to the position of true verticality of the parallelogrammatic mechanism, as above noted. After this transfer has occurred, electromagnet 174 is deenergized to release the transporting means from the conveyor, the return cylinder 160 is actuated to retract its piston rod 162 to return the transporting means to the disclosed position, and the clamping cylinder 96 is caused to extend its rod 98 to return the clamping arm weldments to their normal position in preparation for the acceptance of a succeeding article 44.

The provision of any of a number of types of means for accomplishing this sequencing is well within the capabilities of those skilled in the art, and it will be appreciated that hydraulic, pneumatic, electrical or mechanical means may be employed to accomplish these functions. Whatever means is employed, it is desirable that the arrangement be sufficiently flexible to permit of adjustment to any series of workpieces and, desirably, to permit of adaptation to diverse types and sizes of workpieces.

For completeness of illustration, a rudimentary type of control system is partially represented in the drawings. If the workpiece handled by the transporting means is to be placed in preselected relationship with an article transported by the conveyor, sensing means should be provided for detecting the arrival of a point on the conveyor or of the lower article at the position at which the transporting means should be latched to the conveyor. In the illustrated arrangement, it is the position of the lower workpiece 14 which is sensed. The sensing means comprises a limit switch LS1, of the nonlatching type and having either normally opened or normally closed contacts, mounted upon a bracket 184 welded or otherwise secured to some portion of the structure, representatively to an offset portion of bracket 170. The actuating finger 186 of limit switch LS1 is normally disposed in a position to be actuated by the forward edge of the lower article 14. When limit switch LS1 is triggered, the position of a solenoid operated valve (not shown) is positioned to release the return cylinder 160 so that cylinder 160 will offer no effective resistance to the motion of the transporting means. The actuation of limit switch LS1 also completes a circuit for energizing electromagnets 174 and 174' to latch the transporting mechanism to the conveyor 10. Obviously, the release of cylinder 160 and the actuation of electromagnets 174 and 174' should either concur in time or, if there is not such a concurrence, cylinder 160 should be released an instant before magnets 174 and 174' are energized.

In the disclosed arrangement the engagement of the upper article 44 with the lower article 14 is sensed by detecting the upward movement of the article 44 relative to the clamping arm weldment 82 which results following such engagement and during the subsequent small-arc continued motion of the clamping arm weldments. To this end, a limit switch LS2 is mounted upon the clamping arm weldment 82, with the actuating finger 188 thereof extending to a position closely overlying the upper surface of the article 44. When limit switch LS2 is tripped, the position of a solenoid-operated valve (not shown) is shifted to cause clamping cylinder 96 to retract its piston 98 to swing the clamping arm weldments away from the article 44. Since limit switch LS2 moves with the clamping arm 82, it will be released as a result of this motion. The release of limit switch LS2 may be employed (in conjunction, for example, with a relay registering the fact of the immediately prior actuated condition of the limit switch LS2) to deenergize electromagnets 174 and 174' and to shift the position of the first-mentioned control valve to cause cylinder 160 to retract its piston rod 162 (either concurrently or in that order) to restore the transporting means to normal position. The release of limit switch LS2 may also be employed to cause the clamping arm assembly to be restored to normal. Desirably, either a delay is interposed the release of limit switch LS2 and this actuation of clamping cylinder 96 or else the flow of fluid to the cylinder 96 is metered so that there is no possibility of the clamping arm weldments returning into engagement with the transferred article 44. The assembled articles are then carried by conveyor 10, finger 186 of limit switch LS1 being cammed out of the way during and as a result of the relative movement between article 14 and that limit switch.

It will be appreciated that the described sensing means and operating mechanism is but representative, that other forms may be employed, and that it may be desirable in practice to provide safety, interlocking and sequence assuring arrangements not here specifically mentioned.

It will also be apparent that other latching means may be employed for mechanically connecting the transporting means with the main conveyor. As an example, the electromagnetic latching means 174 and 174' disclosed in Figs. 1 and 2 of the drawings may be replaced by the clamping arrangement shown in Fig. 3 of the drawings. In that view, supporting member 192 is rigidly connected with bracket 170 or angle 118, or equivalents thereof, in the views of Figs. 1 and 2. A hydraulic or pneumatic cylinder or a solenoid coil 194, mounted upon a bracket 196 secured to supporting member 192, is adapted to move rod 198 in a vertical sense between the shown position and an upper position. Links 200 and 202 connect rod 198 with the upper end of lever arms 204 and 206, respectively, each of which is pivoted about a shaft 208 secured by a bracket 210 to the supporting member 192. The lower ends of levers 204 and 206 are disposed in spaced parallelism with one another on opposite sides of the moving surface 22a of a main conveyor system to serve as clamping jaws. When element 194 is energized to move rod 198 upwardly, the jaw ends of levers 204 and 206 are caused firmly to grasp surface 22a, thereby latching the transporting means to the main conveyor. A compression spring 211 is disposed between the levers 204 and 206 to return the clamping means to its normal position upon deactuation of the element 194.

In the still further modification schematically represented in Fig. 4 of the drawings, the moving surface 22b of the main conveyor system is assumed to be provided with a V-block 212 accurately positioned thereon with respect to a selected point of article deposition or to a lower article carried by the main conveyor. The hydraulic or pneumatic cylinder or solenoid coil 214 is secured to the transporting means in any suitable fashion, and is adapted, when actuated, to move the rod 216 downwardly against the restoring action of spring 218. Rod 216 carries a tapered locating pin 220 adapted to engage the notch in the member 212. This arrangement has the merit that minor misalignments resulting from improper adjustment of the sensing or control equipment are compensated upon the mating of the elements 212 and 220.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a system for conveying articles, a conveyor, motive means for moving said conveyor, transporting means movable by said conveyor for moving an article at a controlled velocity from a remote point to a preselected position on said conveyor, means on said conveyor indicating said preselected position, sensing means for sensing the arrival of said indicating means at a preselected point, and means controlled by said sensing means for connecting said transporting means to said conveyor.

2. In a system for conveying articles, conveyor means adapted to continuously move a workpiece over a distance, means for sensing the arrival of the workpiece at a preselected position, transporting means effective when connected to said conveyor means for transporting an article from a remote point to a position on said conveyor means at a controlled velocity and in preselected relationship to said workpiece, and latching means controlled by said sensing means for connecting said transporting means to said conveyor means.

3. In a system for conveying articles, conveyor means adapted to continuously move a workpiece over a distance, means for sensing the arrival of the workpiece at a preselected position, transporting means effective when connected to said conveyor means for transporting an article from a remote point to a position proximate said conveyor means at a controlled velocity and in preselected relationship to said workpiece, latching means controlled by said sensing means for connecting said transporting means to said conveyor means, and means effective at a preselected point in the travel of said transporting means for transferring the article from said transporting means to said conveyor means.

4. In a system for conveying articles, a conveyor including a moving surface, a parallelogrammatic mechanism disposed adjacent said conveyor and having a plurality of pivotally mounted arms supporting an article carrying portion, said mechanism being effective when driven to swing said article carrying portion from a position remote from said conveyor to a position proximate said conveyor, and means for controlling the swinging movement of said mechanism comprising selectively actuatable latching means for connecting said mechanism to said moving surface.

5. In a system for conveying articles, a conveyor including a moving surface, a parollelogrammatic mechanism disposed adjacent said conveyor and having a plurality of pivotally mounted arms supporting a releasable article carrying portion, said mechanism being effective when driven to swing said article carrying portion from a position remote from said conveyor to a position proximate said conveyor, means for controlling the swinging movement of said mechanism comprising selectively actuatable latching means for connecting said mechanism to said moving surface, and means effective at a preselected point in the travel of said mechanism for releasing said article carrying portion to transfer an article carried thereby to said conveyor.

6. In a system for conveying articles, a conveyor including a moving surface movable along a horizontal line, a horizontal track paralleling the line of motion of the conveyor, a wheeled carriage supported by said track and movable horizontally along said track, a slide carried by said carriage, means on said carriage guiding said slide for vertical motion relative to said carriage, a horizontal shaft supported above said conveyor and fixed against movement in translation relative to said track and extending perpendicularly to said track, an arm having one end pivoted on said shaft and the other end pivotally connected to said slide, article supporting means supported by said slide, and means for pivoting said arm about said shaft.

7. The combination of claim 6 in which said arm is an element of a parallelogrammatic mechanism supporting said slide and maintaining said article supporting means in selected orientation relative to the plane of the moving surface.

8. The combination of claim 6 in which said article supporting means is effective to release an article supported thereby when that article supporting means is swung into proximity to said surface.

9. The combination of claim 6 in which the velocities of the movements of said carriage, slide and arm in one direction are controlled by said moving surface.

10. The combination of claim 6 further including means for exerting forces to maintain said slide in an upper position, means for releasing said slide for permitting said slide to move downwardly, and means including said arm for moving said article supporting means through an arc towards said conveyor at a vertical velocity which approaches zero as the article supporting means approaches said conveyor.

11. The combination of claim 6 further including means for exerting forces to maintain said slide in an upper position, means for releasing said slide for permitting said slide to move downwardly and forwardly in response to gravitational forces and through an arc controlled by said arm to move said article supporting means towards said conveyor, and means for selectively interconnecting said slide and said conveyor for controlling the velocity of the arcuate motion of said slide in accordance with the velocity of movement of said conveyor.

12. In a system for conveying articles, conveyor means including a continuously moving surface, means for supporting an article, parallelogrammatic means for supporting said article supporting means comprising a pair of parallel shafts substantially equally spaced from said surface and supported in parallelism with said surface and perpendicular to the line of travel of said surface and a pair of parallel arms each having one end pivotally connected to a respective one of said shafts and the other end pivotally connected to said article supporting means, means including said parallelogrammatic means for swinging said article supporting means from a stationary position spaced from said surface through an arc toward said surface and in the direction of movement of said surface, means for selectively interconnecting said parallelogrammatic means and said surface for causing the rate of movement of said surface to control the rate of swinging of said article supporting means, and means effective when said article supporting means has been swung into proximity to said surface for transferring the article to said surface.

References Cited in the file of this patent
UNITED STATES PATENTS

| | | |
|---|---|---|
| 910,499 | Case | Jan. 26, 1909 |
| 1,479,809 | Headley et al. | Jan. 8, 1924 |
| 2,205,178 | Schreiber | June 18, 1940 |
| 2,393,682 | Hekman | Jan. 29, 1946 |
| 2,611,493 | Nordquist | Sept. 23, 1952 |
| 2,760,536 | Willsey | Aug. 28, 1956 |
| 2,773,582 | Denyssen et al. | Dec. 11, 1956 |